United States Patent [19]

Freter

[11] 3,968,494

[45] July 6, 1976

[54] ANALYZER DEVICE FOR A VOR NAVIGATIONAL RECEIVER

[75] Inventor: Walter Freter, Munich, Germany

[73] Assignee: Siemens Aktiengesellschaft, Berlin & Munich, Germany

[22] Filed: May 5, 1975

[21] Appl. No.: 574,633

[30] Foreign Application Priority Data

May 6, 1974 Germany............................. 2421772

[52] U.S. Cl. ............................. 343/106 R; 343/107
[51] Int. Cl.² ............................................. G01S 1/44
[58] Field of Search ...................... 343/106 R, 107

[56] References Cited
UNITED STATES PATENTS

| | | | |
|---|---|---|---|
| 3,792,473 | 2/1974 | Sawicki | 343/106 R |
| 3,800,125 | 3/1974 | Cleary, Jr. | 343/106 R |

Primary Examiner—Maynard R. Wilbur
Assistant Examiner—T. M. Blum
Attorney, Agent, or Firm—Hill, Gross, Simpson, Van Santen, Steadman, Chiara & Simpson

[57] ABSTRACT

An analyzer device for VOR navigational receivers utilizes a first receiver section in which the reference phase, transmitted in the form of a frequency modulation, is available in demodulated form as reference signal, and a second receiver section in which the rotational phase, depending upon the particular direction of the antenna pattern, occurs in the form of an amplitude modulated rotating signal. Angular information in the azimuthal plane is obtained from a comparison of the reference phase with the rotational phase. In one of the two receiver sections a demodulated signal is applied to a frequency multiplier having a multiplication factor $k$, which is selected as a whole number multiple ($k = 360 \cdot n$) or as a fraction ($k = 360 : n$) of 360. The multiplied received signal is fed to a counter which converts the phase difference between the reference signal and the rotational into a corresponding number of counting increments which are displayed by a display device as the angular deviation from a reference direction.

13 Claims, 4 Drawing Figures

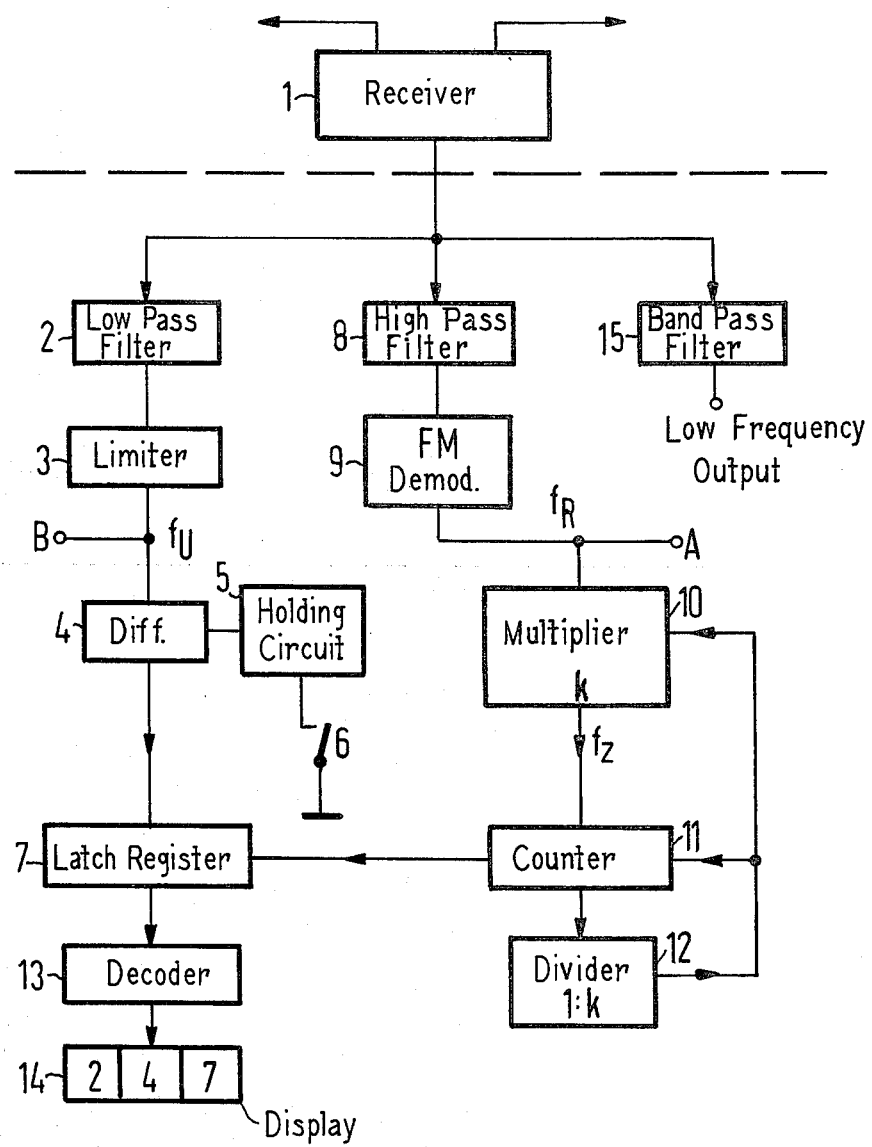

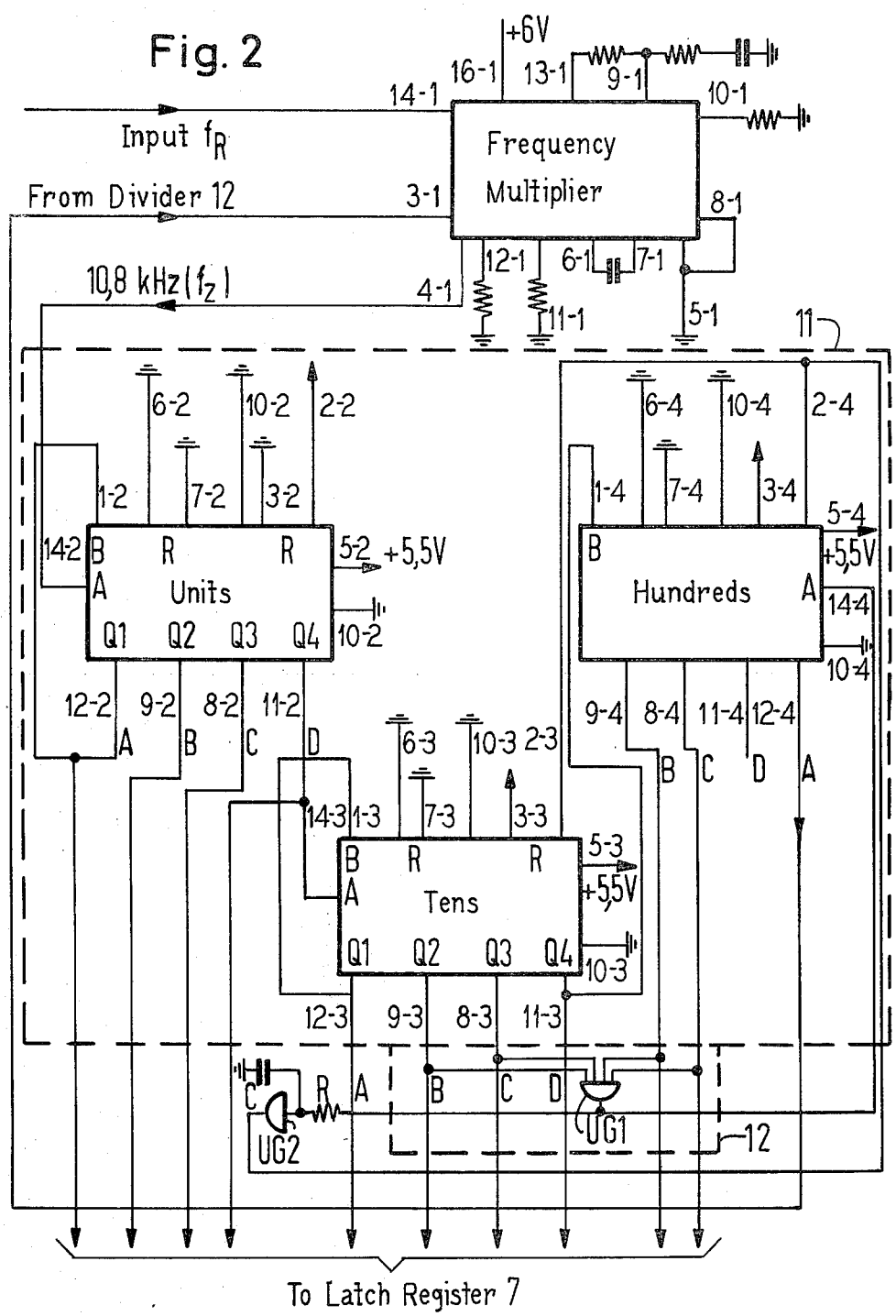

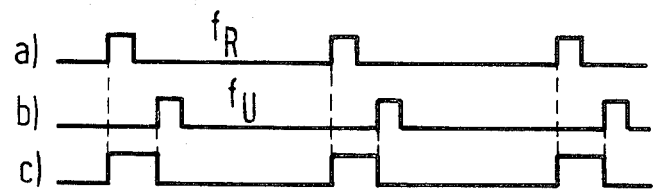
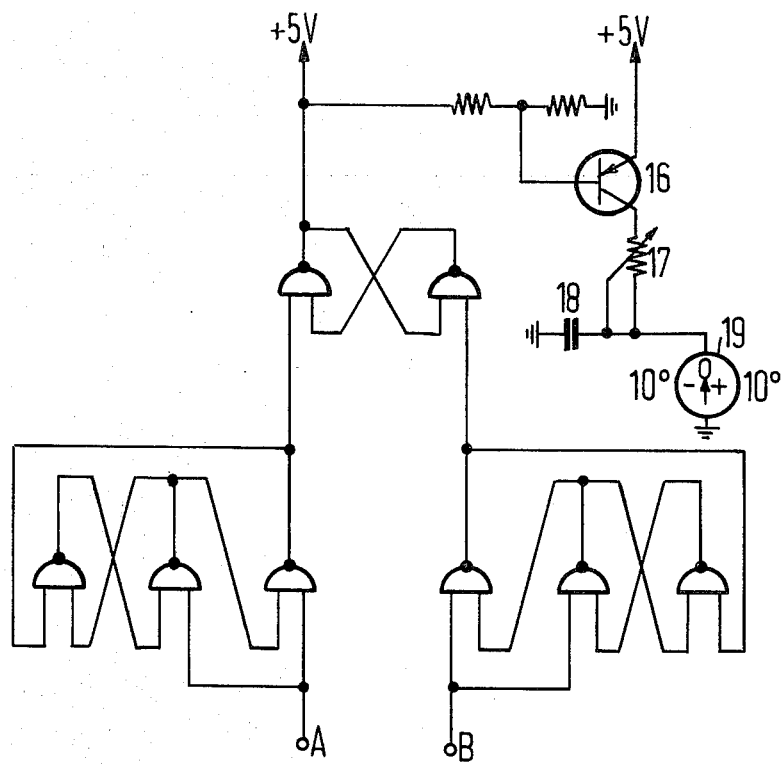

ANALYZER DEVICE FOR A VOR NAVIGATIONAL RECEIVER

BACKGROUND OF THE INVENTION

1. Field of the Invention

The present invention relates to an analyzer device for a VOR navigational receiver which utilizes a first receiver section in which the reference phase, transmitted in the form of a frequency modulation, is available in demodulated form as reference signal, and a second receiver section in which the rotational phase, depending upon the particular direction of the antenna pattern, occurs in the form of an amplitude modulated rotating signal, and in which angular information in the azimuthal plane is obtained from a comparison of the reference phase with the rotational phase.

2. Description of the Prior Art

From German Pat. No. 1,591,904 as well as from French Pat. No. 1,435,126, phase-measuring devices are known in which an oscillator provides output pulses which are applied to a counter as counting pulses. The frequency of this oscillator is a whole number multiple of 360 and the counting operation itself is started when the phase reference signal has a zero transit. The next zero transit of the oscillation whose phase is to be measured, ends the counting operation. The count thus reached is therefore proportional to the phase angle between the two oscillations. Because the known devices use a built-in oscillator which furnishes the counting pulses, frequency deviations in this oscillator are directly incorporated into the measurement and affect its accuracy.

From the magazine "Aerokurier" (Aerocourier) 3/1974 pages 148 to 149, a VOR receiver is known in which an angle is displayed together with further information in the form of a TO or FROM indication. A pilot thus, in relation to a specific ground station, not only has a piece of absolute angular information in the azimuthal plane (derived from a specific reference direction), but also has two pieces of information which must be correspondingly combined. This makes appreciation of the instrument reading complex and there is the risk that if the wrong combination is chosen then the wrong course will be flown.

SUMMARY OF THE INVENTION

The present invention, which relates to a receiver of the kind initially described, seeks to overcome these difficulties and to provide a VOR receiver of simplest possible design which furnishes an accurate absolute angular indication in the azimuthal plane.

In accordance with the invention, the above objectives are achieved in that in one of the two receiver sections the demodulated signal is applied to a frequency multiplier having multiplication factor $k$ which is chosen as a whole number multiple ($k = 360.n$) or as a fraction ($k = 360 : n$) of 360. The frequency-multiplied received signal is supplied to a counter cascade which converts the phase difference between the reference signal and the rotational signal into a corresponding number of counting increments and, in a display circuit, the counting increments thus obtained are displayed on their own as the angular deviation from a reference direction.

In this fashion, since it is solely the absolute azimuthal angle which is displayed, it is possible to dispense with the TO and FROM indication. Moreover, a built-in oscillator to produce the counting pulses required for the phase measurement is no longer needed because the pulses are derived directly, by frequency multiplication, from the received signal. The receiver can thus be made lighter and less expensive.

As far as accuracy is concerned, a particular advantage resides in the fact that, at the receiving end, frequency fluctuations in a counting pulse oscillator cannot occur because no such oscillator is required. At the transmitting end, i.e., at the VOR ground station, any fluctuations occurring in the transmitted frequency are excluded from incorporation into the accuracy of the phase measurement because both the rotational signal and the reference signal are rigidly interlocked.

BRIEF DESCRIPTION OF THE DRAWINGS

Other objects, features and advantages of the invention, its organization, construction and operation, will be best understood from the following detailed description, taken in conjunction with the accompanying drawings, on which:

FIG. 1 illustrates the block diagram of an exemplary embodiment of the invention;

FIG. 2 illustrates circuit details of the apparatus illustrated in FIG. 1;

FIG. 3 illustrates a time-phase pulse diagram as an aid in understanding the invention; and FIG. 4 illustrates a circuit design of an analog display auxiliary.

DESCRIPTION OF THE PREFERRED EMBODIMENT

Referring to FIG. 1, the low frequency output signals furnished from the conventional navigational receiver 1 are applied to a first receiver section (analyzer section) which contains a low-pass filter 2, a limiter 3, a differentiating element 4 with associated holding circuit 5 and a key 6. The output signals from the differentiating element 4 are supplied to a holding register 7, or latch register as it is more commonly known.

The low-pass filter 2 filters out the 30 Hz rotational signal $f_U$ from the ground station. From these 30 Hz oscillations obtained in this manner, the limiter 3 forms a square-wave signal which is converted by the differentiating element 4 into a series of very narrow needle pulses. The latch circuit 5 is designed to retain for a specific time a specific count representing the angle in relation to a reference direction. In this fashion, instrument reading by the pilot is facilitated because continuous changes in the angular values do not arise when the course fluctuates. If the pilot requires immediate and continuous read-out of the particular angular value, then it is possible by depressing the key 6 to disconnect the latch circuit 5 for a specific time, whereupon the particular angular values are displayed progressively.

In the second receiver section (analyzer section), to which the frequency modulated reference signal is applied, there is a high-pass filter 8, an FM demodulator 9, a frequency multiplier stage 10, a counter cascade 11 and a divider 12. The counter cascade 11 is connected to the latch register 7 which stores the particular count. The high-pass filter 8 is tuned to 9.96 kHz, the carrier of the frequency modulated reference oscillation. At the output of the FM demodulator 9 accordingly the reference signal $f_R$ appears, which is a standard 30 Hz oscillation. This reference signal, conveniently already in the form of a square-wave oscillation, is applied to a frequency multiplier 10, in respect of whose output frequency the relationship is $f_Z = k.f_R$. Depending upon the required accuracy of the display of the angle, $k$ should be chosen as $k = 360.n$ or $k = 360:n$, and in all cases $n$ is a whole number. If, by way of a simple example one takes any $n = 1$ then $k$ is 360. Accordingly, the frequency multiplier 10 would multiply the arriving reference frequency $f_R = 360$ Hz to give $30.360 = 10\,800$ Hz. The output signal which represents the counting signal for the counting cascade 11, would therefore have a frequency of $f_Z = 10\,800$ Hz. The counter 11 is so operated that for a full oscillation of the reference frequency $f_R$, commencing with a positive going zero transit, it counts up to the value $k = 360.n$ or possibly $360:n$, $n$ being a whole number. Considering the previously assumed numerical value of $n = 1$, $k = 360$ and the counter cascade 11 thus counts during an oscillation of the reference signal $f_R$, from 0 to 359. The count 360 is identical with the value 0, i.e., the counter cascade 11 is reset after a full run through, to the value 0. The resetting of the counter cascade 11 is effected by the divider 12 which is responsive to the value $1:k$. In the present example, where $k = 360$, the reset pulse for the counter cascade 11 is issued by the divider 12 at the instant at which the count 360 would follow the count 359. In the counter cascade 11 itself, the count 360 does not however appear, the count 0 appearing instead.

The divider 12 can conveniently also be utilized to adjust the frequency multiplier 10, by means of a reference trigger signal. Further details in this context are explained in the description of FIG. 2.

The count reached by the counter cascade 11 is progressively fed into the latch register 7, and in the example chosen earlier this means counts progressively reached between 0 and 359. At a specific instant (e.g. with a positive-going zero transit on the part of the rotational signal), which depends upon the phase angle between the reference signal $f_R$ and the rotational signal $f_U$, a gating pulse is supplied from the output of the differentiating element 4 to the input of the latch register 7. This gating pulse 6 is the count reached at this instant by the counter cascade 11, and applies it to a decoder 13. The function of the decoder 13 is to convert the binary count which is produced if the counter cascade 11 is a binary one, into decimal numbers which are then displayed on an instrument 14. Taking the assumed case of $k = 360$, the instrument 14 thus displays whole degrees of arc, in the present example the azimuthal angular value 247°, in relation to a reference direction.

The frequency multiplier 10 as well as the counter cascade 11 and the divider 12 can also be included in the receiver section for the rotational signal $f_U$ to do this, the differentiating element 4, the latch circuit 5 and the key 6 would then have to be introduced into the receiver section for the reference signal $f_R$. Generally, it is of particular advantage to arrange for this incorporation to take place in that section in which the information is present as a frequency modulation, because the vulnerability to disturbance is least at that point. Using a band pass filter 15, it is possible in a manner known per se to filter out the speech (or coding signals) from the ground station, and apply it (them) to a corresponding low-frequency output.

In FIG. 2, details of the elements 10, 11 and 12 of FIG. 1 have been reproduced. For the triggered frequency multiplier 10, for example a circuit of the type RCA CD 4046 AE will be used. The input signal for this circuit is applied in the form of the reference signal $f_R$ to the terminal 14-1, where the initial digits identify the actual circuit connections according to the numbering of the circuits by the manufacturer. At the terminal 14-1 the output signal is present in frequency multiplied form as a signal $f_Z$ (for example with $k = 360$ at 10.8 kHz). The connecting up of the other terminals is carried out in a conventional way here and in the ensuing counter decades, and therefore requires no further description. The counter cascade 11 consists of three counter decades (for example types SN 7490 N of Texas Instruments). The signal $f_Z$ is applied to the terminal 14-2 of the first counter decade. The terminal 11-2 of the first counter decade is connected to the terminal 14-3 of the next counter decade whose terminal 11-3 is in turn connected to the terminal 1-4 of the third counter decade.

The B, C, D outputs 13-2, 9-3, 8-3 and 11-3, are taken to the latch register 7 of FIG. 1, which has not been shown here. In a similar way, the terminals 12-2, 9-2, 8-2 and 11-2 of the second counter decade are taken to the latch register 7. In the case of the third counter decade, only the terminals 9-3 and 8-3 are taken to the latch register 7.

The first counter decade thus counts the units, the second counter decade the tens and the third counter decade the hundreds, to give a display of whole degrees of arc corresponding to $k = 360$. The divider 12 of FIG. 1 is essentially constituted by an AND-gate UG1. This AND-gate has four inputs which are connected to the terminals 9-2 and 8-2 of this second counter decade and those 9-3 and 8-3 of the third counter decade. This ensures that it is only when the counter 359 is reached or, generally speaking $k = 1$, that an output pulse appears at the AND-gate UG1.

This output signal, from the AND-gate UG1, is applied to a differentiating element consisting of the ohmic resistor R, the capacitor C and the AND-gate UG2 whence it is applied to the reset inputs 2—2 of the two counter decades which belong to the tens and hundreds places.

Because the counter decade for the hundreds stage is not fully exploited, it can perform a further function in addition to that of counting. To this end, the output of the AND-gate UG1 is connected to the terminal 14-2 of the counter decade. The output 12-2 of the trigger stage thus formed is taken to the terminal 3-1 of the triggered frequency multiplier 10 and is responsible there for effecting precise corrective control.

The determination of the angular value of the phase difference between the reference signal $f_R$ and the rotational signal $f_U$ is independent of whether the arriving frequencies $f_U$ and $f_R$ are both exactly 30 Hz or both deviate from this value, as long as the relative phase between the two oscillations remains the same. This will be explained hereinafter making reference to a numerical example. If the phase difference between $f_U$ and $f_R$ is precisely 180°, and if the rotational frequency $f_U$ and the reference frequency are exactly equal to 30 Hz, then the counting frequency in the chosen example (where $k = 360$) will be 10 800 Hz. If, for example, we assume that $f_R$ and $f_U$ are 16 Hz, but the phase angle between the two is still 180° as before, then the multiplied frequency will be $f_Z = 5\,760$ Hz. The phase angle indication does not change however because for the phase difference of 180°, in this case too, at the instant at which gating takes place, the count 180 will have been reached and this will therefore be applied via the latch register 7 to the display 14.

The illustrated analyzer equipment will be sufficient in the case of many smaller aircraft, for normal navigational purposes. However, in many cases it is necessary (for example in order to fly airways), to continuously maintain a specific azimuthal direction. In such instances, the indicated circuit arrangement can be supplemented in a simple fashion and this has been indicated in FIG. 1 by the connections A and B at the output of the FM demodulator 9 and the limiter 3, and will be explained in relation to FIGS. 3 and 4.

In FIG. 3, the output pulses which occur at the terminal A, have been shown in row a), i.e. the reference signal $f_R$. In row b) the rotational signal $f_U$ occurring at the terminal B, has been illustrated. The phase difference between the two trains of square-wave pulses, is given by the interval between the pulses, or, to put it more accurately, by the interval between the rise portions thereof. The information containing the phase difference between the reference signal $f_R$ and the rotational signal $f_U$, is converted into a square-wave signal which has been displayed in row c) of FIG. 3. This square-wave signal defines the magnitude of the phase difference, with its pulse length.

To produce the pulses of row c), a circuit can be used of the kind shown in FIG. 4. There, an addition circuit controlled by pulse edges using AND-gates, has been shown. The output signal from the addition circuit is applied to the base of the transistor 16 whose collector is connected to a variable resistor 17. This resistor 17 forms the charging resistor for a capacitor 18. Depending upon the length of time for which the transistor 16 is conductive (i.e. how long the pulses of row c last) and depending upon what position the variable resistor adopts, the capacitor 18 (integrating circuit) will be charged up to a greater or lesser extent. On an indicating instrument 19, depending upon the required magnitude of the possible deviation from a given course, a zero value and corresponding ± deviations are displayed. In the present example, angular deviations of ±10° are being displayed. If a pilot wishes to fly along a specific airway, for example on a course of 270°, then he will after the heading of his aircraft until the instrument 14 of FIG. 1 indicates the value 270° precisely. At this instant, specific square-wave voltages in accordance with row c of FIG. 3 appear, and by operating a setting knob of the variable resistor 17, the instrument 19 can be so adjusted that for this particular voltage value, the pointer of the instrument 19 reads precisely zero. If, then, in the course of further flight, deviations from the course of 270° occur, then the instrument 19 will display these deviations directly in analog fashion and continuous digital read-out of the display instrument 14 is no longer necessary.

Although I have described my invention by reference to particular illustrative embodiments thereof, many changes and modifications of my invention may become apparent to those skilled in the art without departing from the spirit and scope of my invention. I therefore intend to include within the patent warranted hereon, all such changes and modifications as may reasonably and properly be included within the scope of my contribution to the art.

I claim:

1. In a VOR receiver which receives VOR signals including a reference phase in the form of a frequency modulation and a rotational phase in the form of an amplitude modulation, a first receiver section providing the reference phase as a demodulated reference signal, a second receiver section providing an amplitude demodulated rotating signal, and means for comparing the reference and rotational signals to obtain angular information in the azimuthal plane including an analyzer device comprising:

a frequency multiplier in one of said receiver sections for multiplying the frequency of one of the demodulated signals by a factor $k$, where $k$ is selected as a whole number multiple or as a fraction of 360;

counting means for converting the multiplied signal to a number of counting increments corresponding to the difference between the reference and rotational signals; and display means for displaying the counting increments as the angular deviation from the reference direction.

2. In a VOR receiver according to claim 1, comprising means for producing pulses from the reference and rotational signals, which pulses have a pulse length proportional to the phase difference, an indicator for indicating deviation from a specific reference direction, and an integrated circuit including a variable resistor for setting the indicator to a set point in accordance with said display means.

3. In a VOR receiver according to claim 1, wherein said frequency multiplier is in the receiver section which processes the frequency modulated signal.

4. In a VOR receiver as claimed in claim 1, comprising means for converting said rotational signal, said reference signal and said frequency multiplier signal to square-wave pulses.

5. In a VOR receiver as claimed in claim 1, comprising resetting means for providing a reset pulse for resetting said counting means in response to the count following the count $k-1$.

6. In a VOR receiver as claimed in claim 1, comprising a latch register connected between said counting means and said display means and responsive to a first zero transit of the non-multiplied signal to progressively feed the count to said display means until the next zero transit of the non-multiplied signal.

7. In a VOR receiver according to claim 6, comprising switch means connected to said latch register and operable to hold an information display for a predetermined time interval.

8. In a VOR receiver as claimed in claim 5, comprising differentiating means in the other of said receiver sections for converting the respective square-wave pulses to needle pulses.

9. In a VOR receiver as claimed in claim 5, wherein said counting means comprises a binary counter.

10. In a VOR receiver as claimed in claim 5, wherein said counting means comprises a BCD counter.

11. In a VOR receiver as claimed in claim 10, comprising connecting means supplying said reset pulse as a correction pulse to said multiplier.

12. In a VOR receiver as claimed in claim 5, wherein said resetting means comprises a divider connected to said counting means and having a division ratio of $k$.

13. In a VOR receiver as claimed in claim 12, wherein said divider comprises an AND gate having inputs and an output connected to said counting means and activated in response to the count $k-1$.

* * * * *